United States Patent [19]
Yonemitsu et al.

[11] Patent Number: 5,471,450
[45] Date of Patent: Nov. 28, 1995

[54] DIGITAL DATA REPRODUCING APPARATUS AND METHOD EMPLOYING BUFFER MEMORIES FOR ERROR COMPENSATION AND ACCOMODATING DIFFERENCES IN REPRODUCTION AND PROCESSING RATES

[75] Inventors: Jun Yonemitsu; Hideki Koyanagi; Yoshiyuki Akiyama, all of Kanagawa, Japan

[73] Assignee: Sony Corporation, Tokyo, Japan

[21] Appl. No.: 350,385

[22] Filed: Dec. 8, 1994

Related U.S. Application Data

[63] Continuation of Ser. No. 908,164, Jul. 2, 1992, abandoned.

[30] Foreign Application Priority Data

Jul. 12, 1991 [JP] Japan ..................... 3-198591
Mar. 18, 1992 [JP] Japan ..................... 4-092223

[51] Int. Cl.$^6$ ..................................... G11B 7/00
[52] U.S. Cl. ..................... 369/60; 369/50; 369/54; 369/58
[58] Field of Search ................... 369/54, 58, 60, 369/44.32, 44.28, 50, 47, 48, 49, 53

[56] References Cited

U.S. PATENT DOCUMENTS

| | | | |
|---|---|---|---|
| 4,985,784 | 1/1991 | Tsuboi et al. | |
| 5,212,678 | 5/1993 | Roth et al. | 369/60 |
| 5,239,526 | 8/1993 | Yamagishi et al. | 369/54 |

FOREIGN PATENT DOCUMENTS

| | | |
|---|---|---|
| 0426472A3 | 5/1991 | European Pat. Off. |
| 0460751A2 | 12/1991 | European Pat. Off. |
| 0473305 | 3/1992 | European Pat. Off. |

OTHER PUBLICATIONS

Patent Abstracts of Japan, vol. 12, No. 138 (P–695) 27 Apr. 1988 & JP-A-62 259 268 (Pioneer Electronic Corp) 11 Nov. 1987.
Patent Abstracts of Japan, vol. 14, No. 249 (P–1053) 28 May 1990 & JP-A-20 64 966 (Hitachi Ltd) 5 Mar. 1990.
Signal Processing Image Communication vol. 2, No. 2, Aug. 1990, Amsterdam NL pp. 155–169 Pereira et al. 'A CCITT Compatible Coding Algorithm for Digital Recording of Moving Images'; p. 156, col. 1, line 34—p. 159, col. 1, line 34; figure 2.
Toshiba Review No. 160, 1987, Tokyo JP pp. 39–42 Ohyama et al. 'CD–ROM and Encoder System' p. 41, col. 1, line 28–line 52; figure 2.
Patent Abstracts of Japan vol. 15, No. 480 (P–1284) Dec. 1991 & JP-A-32 05 656 (Sharp Corp).

*Primary Examiner*—Georgia Y. Epps
*Assistant Examiner*—P. W. Huber
*Attorney, Agent, or Firm*—William S. Frommer; Alvin Sinderbrand

[57] ABSTRACT

A digital data reproducing apparatus and method which allows reproduction for a long period of time without deterioration in picture quality. Data are reproduced from an optical disk by a pickup and are transferred to and stored in a ring buffer memory. Data read from the ring buffer memory are transferred to and stored into a video code buffer of an encoder section. The data stored in the video code buffer are encoded in the encoder section and displayed on a display. A track jump judging circuit produces a track jumping instruction to cause the pickup to track jump back to a preceding track when the amount of data stored in the ring buffer memory reaches a predetermined value.

33 Claims, 12 Drawing Sheets

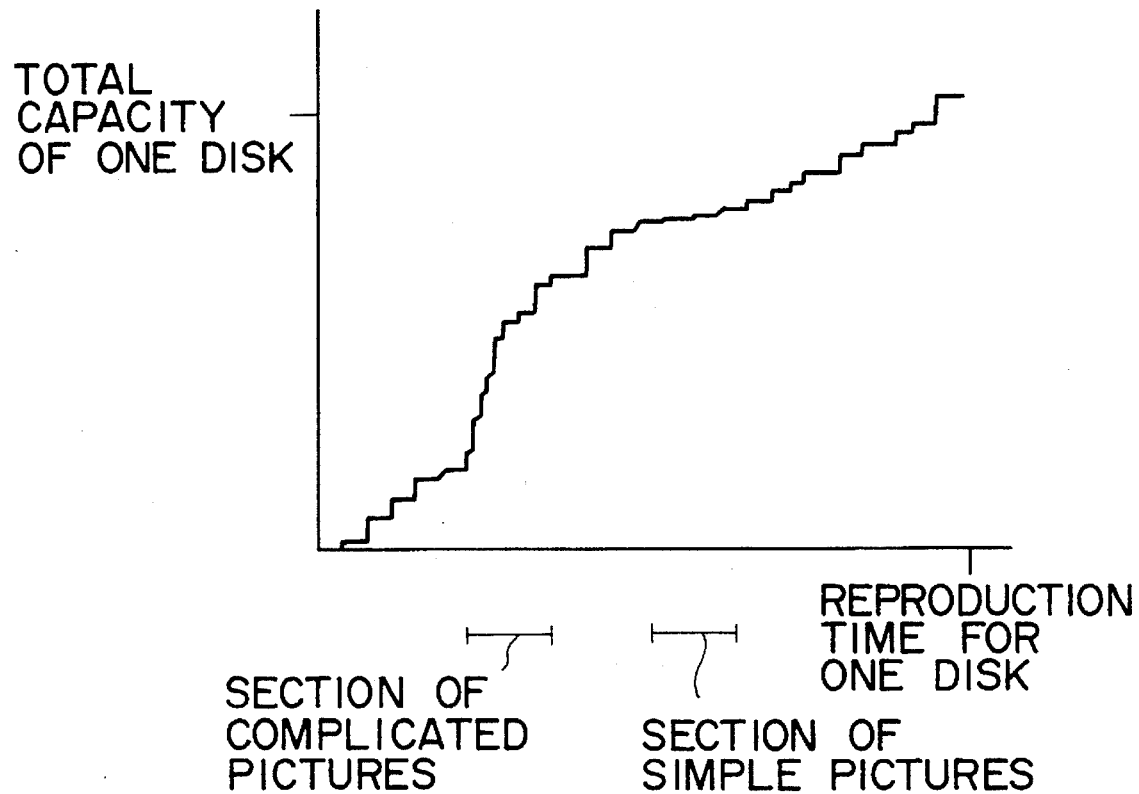

DIGITAL DATA REPRODUCING APPARATUS AND METHOD EMPLOYING BUFFER MEMORIES FOR ERROR COMPENSATION AND ACCOMODATING DIFFERENCES IN REPRODUCTION AND PROCESSING RATES

This application is a continuation of application Ser. No. 07/908,164, filed 7/2/92, now abandoned.

BACKGROUND OF THE INVENTION

1. Field of the Invention

This invention relates to a data reproducing apparatus and method suitably used to reproduce a disk on which image data are recorded digitally, and more particularly to a data reproducing apparatus and method which reproduces a disk on which moving picture data compressed at a variable rate are recorded.

2. Description of the Related Art

When moving pictures are recorded and reproduced digitally, since a very large amount of data are involved, a technique of compressing data is used. FIG. 1 shows construction of an exemplary apparatus which records and reproduces a moving picture in a compressed form.

Referring to FIG. 1, a video signal outputted from a video camera 1 is converted from an analog signal into a digital signal by an analog to digital (A/D) converter 2 and is then stored in a frame memory 3. The data stored in the frame memory 3 are then read out from the frame memory 3 and input to a DCT (discrete cosine transform) circuit 5. The DCT circuit 5 DCT processes the input data. Data output from the DCT circuit 5 are input to and quantized by a quantizing circuit 6 and are then input to a VLC (variable length coder) circuit 7, at which they are converted into variable length codes such as Huffman codes. The variable length codes from the VLC circuit 7 are supplied to and stored in a video code buffer 8.

The data quantized by the quantizing circuit 6 are supplied, when they are data of an I picture (intra-coded image) or a P picture (forward predictive coded image), to and inversely quantized by an inverse quantizing circuit 10. The data inversely quantized by the inverse quantizing circuit 10 are input to an IDCT (inverse discrete cosine transform) circuit 11, at which they are IDCT processed. Output data from the IDCT circuit 11 are supplied by way of an adder 12 to and stored in a frame memory 13.

Meanwhile, a movement detecting circuit 14 detects a movement of an image stored in the frame memory 3 and outputs such movement vector to the VLC circuit 7 and a movement compensating circuit 15. The movement compensating circuit 15 compensates for movement of the data stored in the frame memory 13 corresponding to the movement vector and outputs the thus compensated data to a subtractor 4 and the adder 12. The subtractor 4 subtracts the data input thereto from the movement compensating circuit 15 from the data input thereto from the frame memory 3. Consequently, a P picture is produced using as a predictive image (a reference image with reference to which a difference should be taken) an I picture of a P picture which is positioned forwardly in time and already decoded, or a B picture (bi-directional predictive coded image) is produced using as predictive images three images including an I picture or a P picture which is positioned forwardly in time and already decoded, another I picture or another P picture which is positioned rearwardly in time and already decoded and an interpolation image produced from the two pictures.

An I picture is produced when only data output from the frame memory 3 are supplied to the DCT circuit 5 without making use of data from the movement compensating circuit 15.

The adder 12 adds the movement compensated data received from the movement compensating circuit 15 and the data supplied from the IDCT circuit 11 to produce a decoded image of an I picture, a P picture or a B picture and supplies the thus produced image to the frame memory 13 so that it is stored in the frame memory 13. This means that image data obtained by decoding the same data as the data which have been quantized by the quantizing circuit 6 and supplied to the video code buffer 8 by way of the VLC circuit 7 are stored in the frame memory 13. As a result, it is possible to obtain data of a P picture or a B picture making use of the stored in the frame memory 13.

Meanwhile, a rate controller 9 monitors an amount of data stored in the video code buffer 8 and adjusts the quantizing step size of the quantizing circuit 6 so that the stored amount will not overflow or underflow. Consequently, the bit rate Rv at which data are supplied from the VLC circuit 7 to the video code buffer 8 is varied so that an otherwise possible overflow or underflow of the video code buffer 8 is prevented.

Then, the data stored in the video code buffer 8 in this manner are transferred at a fixed transfer rate to and written onto an optical disk 16. The encoder section of the recording and reproducing apparatus is constructed in the manner as described so far.

Subsequently, construction and operation of the decoder section of the recording and reproducing apparatus will be described. In the decoder section, data reproduced from the optical disk 16 are transferred at a fixed transfer rate to and stored into a video code buffer 21. Data read out from the video code buffer 21 are supplied to an IVLC (inverse variable length coder) circuit 22, at which they are IVLC processed. After completion of such IVLC processing of the input data, the IVLC circuit 22 supplies the data to an inverse quantizing circuit 23. Then, the IVLC circuit 22 outputs a code request to the video code buffer 21 to request transfer of new data.

When such code request is received, the video code buffer 21 transfers new data to the IVLC circuit 22. The transfer rate Rv then is set to a value equal to the bit rate at which data are transferred from the VLC circuit 7 to the video code buffer 8 in the encoder section so that the video code buffer 21 may not overflow or underflow when data are transferred at a fixed transfer rate from the optical disk 16 to the video code buffer 21. In other words, the bit rate in the encoder section is set so that the video code buffer 21 in the decoder section will not overflow or underflow.

The inverse quantizing circuit 23 inversely quantizes the data supplied from the IVLC circuit 22 in accordance with data of the quantizing step size supplied thereto from the IVLC circuit 22. The quantizing step size and a movement vector which is supplied from the IVLC circuit 22 to a movement compensating circuit 26 are supplied from the rate controller 9 and the movement detecting circuit 14 to the VLC circuit 7 and recorded onto the optical disk 16 by way of the video code buffer 8 together with image data in the encoder section and then reproduced from the optical disk 16.

An IDCT circuit 24 IDCT processes the data supplied thereto from the inverse quantizing circuit 23. In case the data thus IDCT processed are I picture data, they are supplied as they are to and stored in a frame memory 27 by way of an adding circuit 25. On the other hand, in case the data output from the IDCT circuit 24 are P picture data for which an I picture is a predictive image, I picture data are read out from the frame memory 27 and are movement compensated by the movement compensating circuit 26, whereafter they are supplied to the adding circuit 25. The adding circuit 25 adds the data output from the IDCT circuit 24 and the data output from the movement compensating circuit 26 to produce P picture data. Also the data thus produced are stored in the frame memory 27.

On the other hand, in case the data output from the IDCT circuit 24 are data of a B picture, I picture data or P picture data are read out from the frame memory 27 and then movement compensated by the movement compensating circuit 26. Whereafter they are supplied to the adding circuit 25. The adding circuit 25 adds the data output from the IDCT circuit 24 and the data received from the movement compensating circuit 26 so that decoded B picture data are obtained. Also the data are stored in the frame memory 27.

The data stored in the frame memory 27 in this manner are converted from digital values into analog values by a digital to analog (D/A) converter 28 and then supplied to and displayed on a display 29.

In this manner, the redundancy in a frame is reduced by DCT processing and the redundancy between frames is reduced using a movement vector, and a high compression ratio is realized by a combination of techniques.

In the conventional recording and reproducing apparatus, data are transferred at a fixed rate from the optical disk 16 to the video code buffer 21 in this manner. In this instance, the quantizing step size of the quantizing circuit 6 is controlled in advance in accordance with a stored amount of data in the video code buffer 8 of the encoder section to adjust the transfer rate from the VLC circuit 7 to the video code buffer 8 so that the video code buffer 21 does not overflow or underflow.

While, for example, in the case of an MPEG, an I picture is inserted at an interval of time of about 0.5 seconds. The amount of data of a P picture or a B picture is much smaller than the amount of data of an I picture. As a result, the amount of data to be transferred to the IVLC circuit 22 at an interval of time of 0.5 seconds will vary periodically. However, since the video code buffer 21 is provided, if the variation of the amount of data per unit time is within the range of the capacity of the video code buffer 21, then it is possible to follow up the variation of the amount of data and consequently, data are supplied to the IVLC circuit 22 regularly.

However, in case, for example, a plurality of complicated screens are to be encoded successively, since the bit rate upon transfer from the VLC circuit 7 is higher, in order to prevent the video code buffer 8 from overflowing, the quantizing step size of the quantizing circuit 6 must be set to a high value, which will result in the problem that the quality of the picture varies.

Thus, it seems a promising solution, for example, to fix the quantizing step size of the quantizing circuit 6 so that a code train at a variable rate output from the VLC circuit 7 is recorded as it is onto the optical disk 16 to achieve uniformity in picture quality. However, if such optical disk 16 is reproduced on the conventional reproducing apparatus, then if decoding of complicated screens continues for several seconds, the video code buffer 21 will underflow. On the other hand, if decoding of simple screens continues, then the video code buffer 21 will overflow. After all, correct reproduction images cannot be obtained.

Further, there is another solution wherein the average bit rate is set in advance to such a high value that the apparatus can cope. For example, with complicated screens. With this solution, however, much data are transferred even for a simple screen, and consequently, the time within which an optical disk can be recorded or reproduced becomes short.

Further, in the conventional apparatus, error correction for data read out from the optical disk 16 is performed by an error correcting circuit (not shown). However, in case a reproduction signal is deteriorated, for example, by dust sticking to the optical disk 16 or the tracking servo is put out of order by mechanical vibrations from the outside, error correction becomes impossible and consequently the picture quality is deteriorated.

SUMMARY OF THE INVENTION

It is an object of the present invention to provide a digital data reproducing apparatus and method by which a reproduction image free from deterioration in picture quality can be obtained and particularly a reproduction image of uniform picture quality can be obtained from a disk on which a code train at a variable rate is recorded.

It is another object of the present invention to provide a digital data reproducing apparatus and method wherein picture images can be reproduced for a long period of time from a disk of a limited capacity.

It is a further object of the present invention to provide a digital data reproducing apparatus and method wherein an image can be reproduced, upon occurrence of an error, without deteriorating the picture quality.

In accordance with a first aspect of the present invention, a digital data reproducing apparatus comprises, for example, a pickup for reproducing data recorded on a disk such as, for example, an optical disk, storage means composed of, for example, a ring buffer memory for storing therein data at least for one track reproduced from the optical disk, decoding means composed of, for example, a decoding section for decoding the data read out from the ring buffer memory, and jump controlling means composed of, for example, a track jump judging circuit for causing the pickup to perform track jumping in accordance with an amount of data stored in the ring buffer memory.

As a second aspect of the present invention, the digital data reproducing apparatus further comprises error detecting means composed of, for example, a sector detecting circuit or an ECC circuit for detecting an error of data reproduced by the pickup, the track jump judging circuit causing the pickup to perform track jumping in response to an error of the data detected by the sector detecting circuit or the ECC circuit.

The above and other objects, features and advantages of the present invention will be apparent in the following description of a preferred embodiment when read in conjunction with the accompanying drawings, in which like reference numerals are used to identify the same or similar parts in the several views.

BRIEF DESCRIPTION OF THE DRAWINGS

FIG. 11 is a diagram illustrating a variation in the amount of data reproduced from an optical disk by the data reproducing apparatus shown in FIG. 3;

DESCRIPTION OF THE INVENTION

Figure 1:
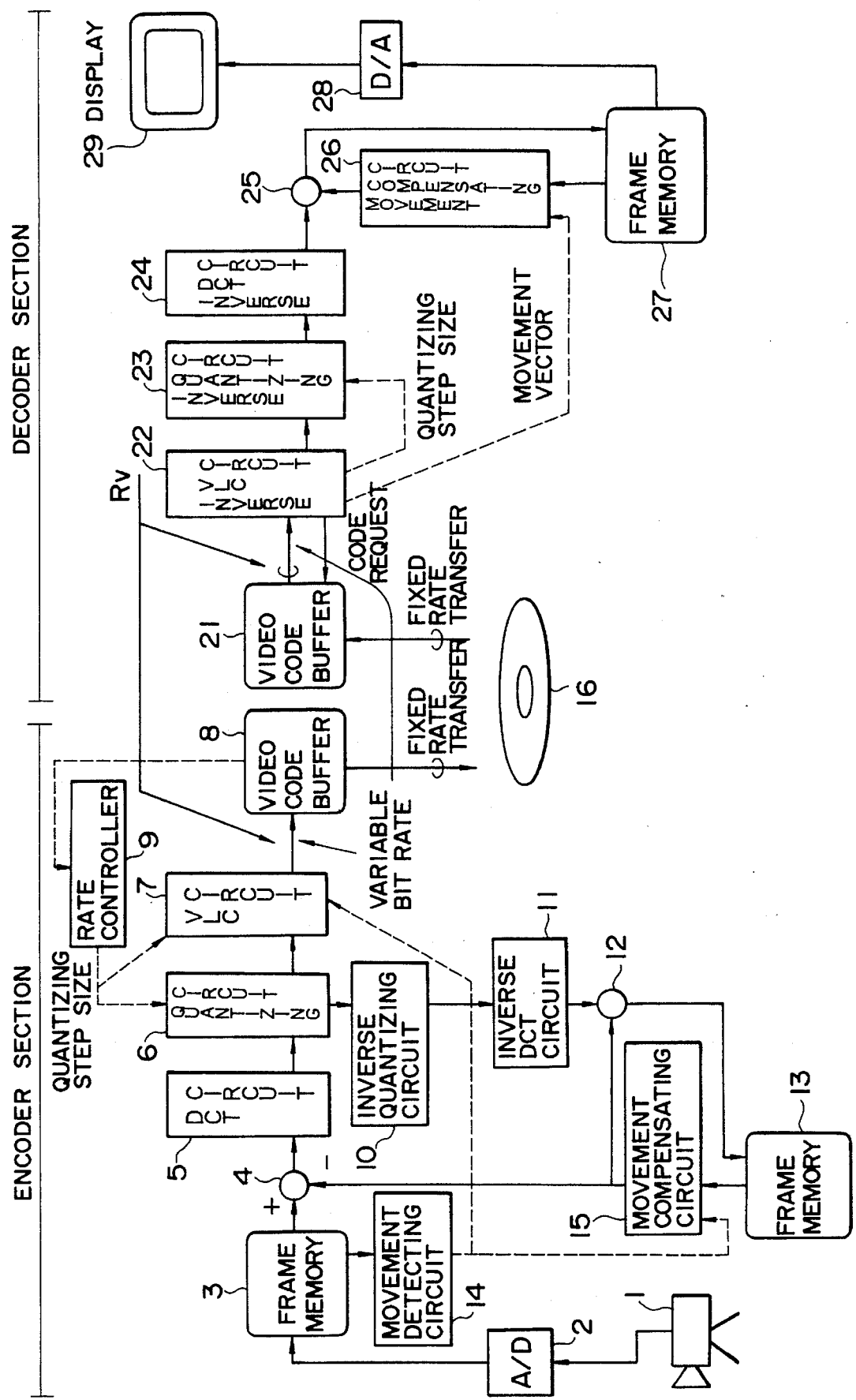
FIG. 1 is a block diagram showing an exemplary conventional data recording and reproducing apparatus.
Figure 2:
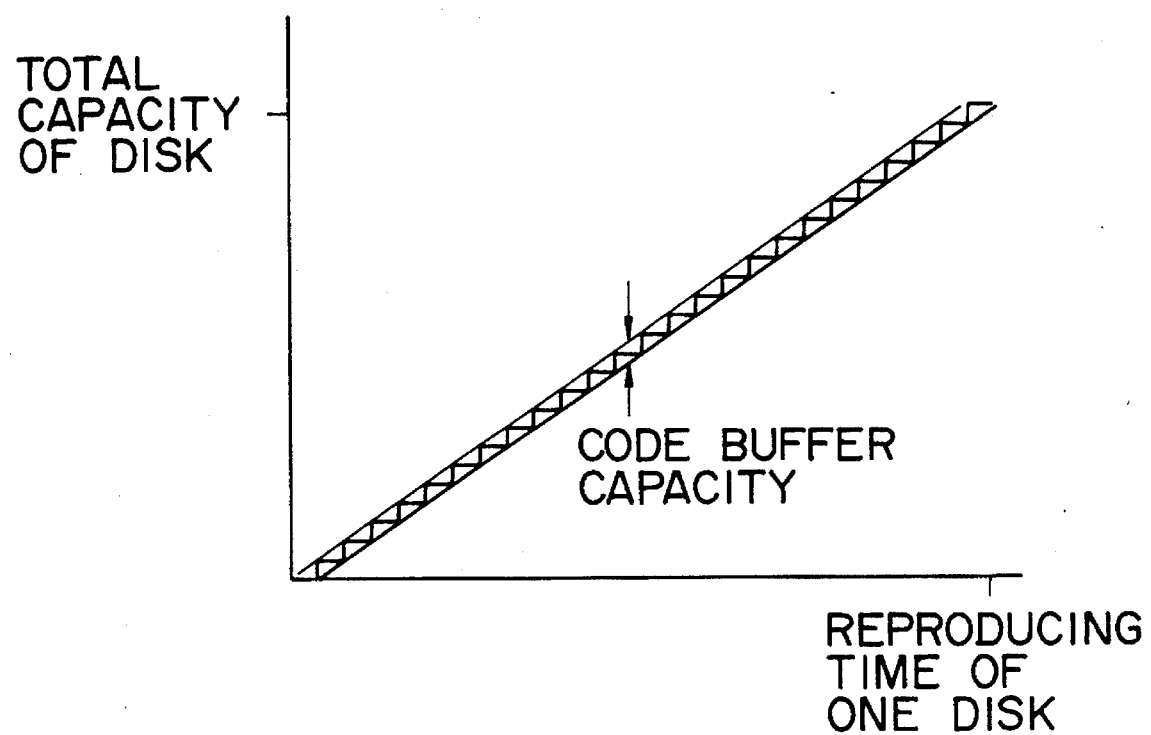
FIG. 2 is a diagram illustrating a variation of the amount of data reproduced from an optical disk by the data recording and reproducing apparatus shown in FIG. 1.
Figure 3:
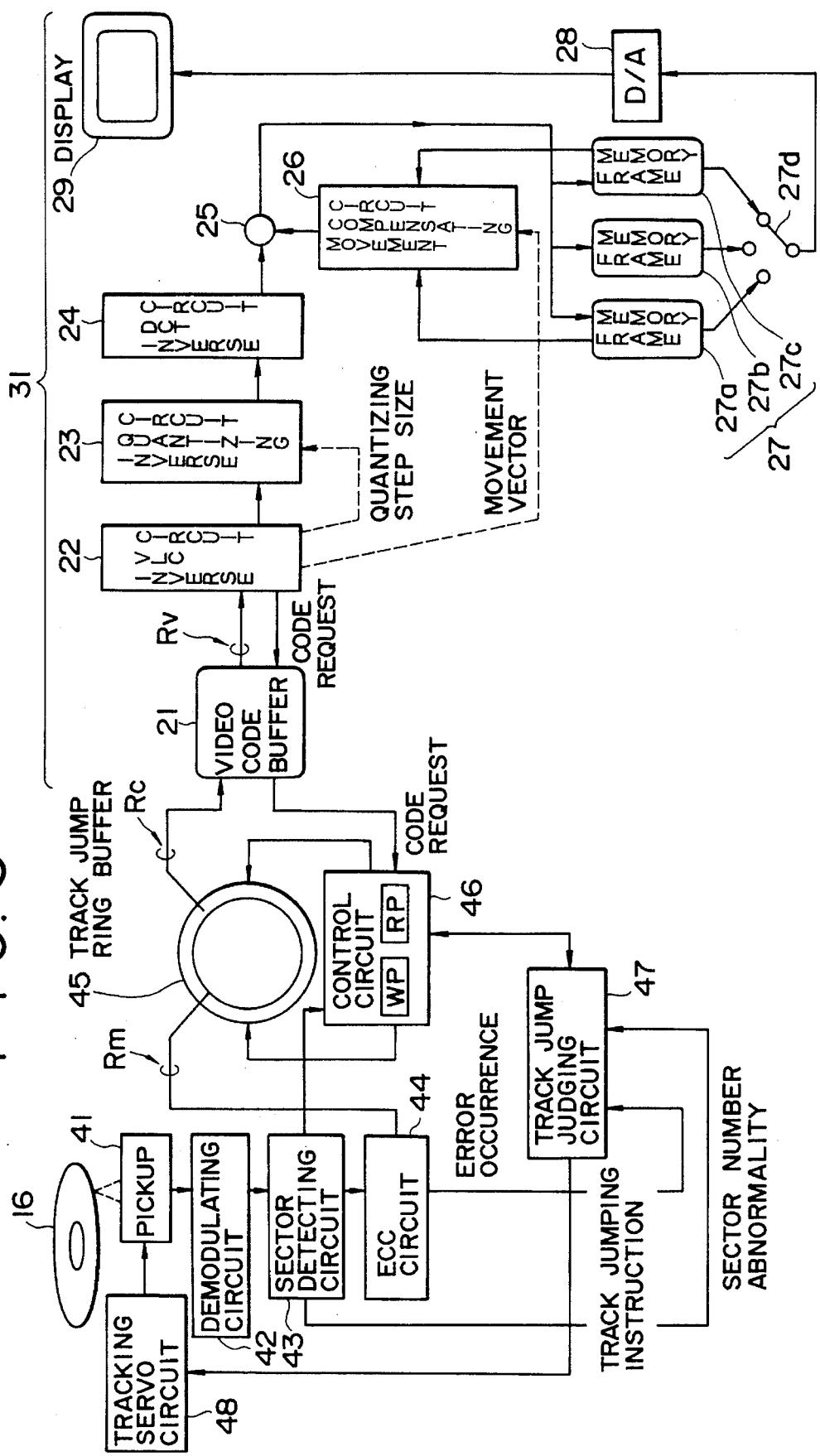
FIG. 3 is a block diagram of a data reproducing apparatus showing a preferred embodiment of the present invention.

Referring first to FIG. 3, there is shown in block diagram form a data reproducing apparatus according to a preferred embodiment of the present invention. It is to be noted that like elements are denoted by the same reference characters as in FIG. 1. Data recorded on an optical disk 16 are reproduced by means of a pickup 41. The pickup 41 irradiates a laser beam upon the optical disk 16 and reproduces data recorded on the optical disk 16 from reflected light from the optical disk 16. A demodulating circuit 42 demodulates the reproduction signal output from the pickup 41 and outputs the demodulated reproduction signal to a sector detecting circuit 43. The sector detecting circuit 43 detects an address recorded for each sector of the optical disk 16 from the data input thereto from the demodulating circuit 42 and outputs the detected address to a control circuit 46. The sector detecting circuit 43 further outputs data in a sector synchronized relationship to an ECC circuit 44 at a subsequent stage. Further, when the sector detecting circuit 43 fails to detect an address or finds out that detected addresses do not provide consecutive numbers, it outputs a sector number irregularity signal to a track jump judging circuit 47.

The ECC circuit 44 detects an error of data supplied thereto from the sector detecting circuit 43, corrects the error using a redundancy bit added to the data and outputs the corrected data to a tack jump ring buffer memory 45 of the first-in-first-out (FIFO) type. Further, when the ECC circuit 44 cannot correct the error of the data, it outputs an error occurrence signal to the track jump judging circuit 47. The control circuit 46 controls writing into and reading out from the ring buffer memory 45 and monitors a code request signal output from an IVLC circuit 22 by way of a video code buffer 21 and requesting data.

The track jump judging circuit 47 monitors an output of the control circuit 46 and outputs, when track jumping is required, a track jumping signal to a tracking servo circuit 48 so that the reproducing position of the pickup 41 jumps a track. Further, the track jump judging circuit 47 detects a sector number irregularity signal form the sector detecting circuit 43 or an error occurrence signal from the ECC circuit 44 and outputs a track jumping signal to the tracking servo circuit 48 so that the reproducing position of the pickup 41 jumps a track.

An output of the ring buffer memory 45 is supplied to a video code buffer 21 of a decoder section 31. Construction of the decoder section 31 including the video code buffer 21 to a display 29 is similar to that of the apparatus shown in FIG. 1. In the present embodiment, however, the frame memory 27 includes a pair of frame memories 27a and 27c each for storing an I picture or a P picture therein and a further frame memory 27b for storing a B picture therein.

Subsequently, operation of the data reproducing apparatus of the present embodiment will be described. The pickup 41 irradiates a laser beam upon the optical disk 16 and reproduces, from reflected light from the optical disk 16, data recorded on the optical 16. The reproduction signal output from the pickup 41 is input to and demodulated by the demodulating circuit 42. The data demodulated by the demodulating circuit 42 are input by way of the sector detecting circuit 43 to the ECC circuit 44, in which detection and correction of an error of the data are performed. Is to be noted that, when a sector number (address allotted to a sector of the optical disk 16) is not detected regularly by the sector detecting circuit 43, a sector number irregularity signal is output to the track jump judging circuit 47. The ECC circuit 44 outputs, when data for which correction of an error is impossible are found, an error occurrence signal to the track jump judging circuit 47. Data for which data correction has been performed are supplied from the ECC circuit 44 to and stored in the ring buffer memory 45.

The control circuit 46 reads an address of each sector from an output of the sector detecting circuit 43 and designates a write address (write point (WP)) of the ring buffer memory 45 corresponding to the address thus read. Further, the control circuit 46 designates, in response to a code request signal from the video code buffer 21 at the succeeding stage, a read address (reproducing point (RP)) of data written in the ring buffer memory 45, reads data from the thus designated reproducing point (RP) and supplies the data to the video code buffer 21 to as to store the data in the video code buffer 21.

The data read out from the video code buffer 21 are transferred at a transfer rate Rv to the IVLC circuit 22. The IVLC circuit 22 IVLC processes the thus received data and outputs, after completion of the IVLC processing of the received data, the same to the inverse quantizing circuit 23. The IVLC circuit 22 further outputs a code request signal to the video code buffer 21 to request supply of new video data.

The inverse quantizing circuit 23 inversely quantizes data thus received and outputs the inversely quantized data to the IDCT circuit 24. The IDCT circuit 24 IDCT processes the received data and supplies the same to the adding circuit 25.

When the data output from the adding circuit 25 correspond to an I picture, they are stored in the frame memory 27a or 27c. On the other hand, when the data output from the adding circuit 25 correspond to a B picture, they are stored in the frame memory 27b, but when the data correspond to a P picture, they are stored in the frame memory 27a or 27c. Data of an I picture or a P picture stored in the frame memories 27a and 27c are supplied by way of the movement compensating circuit 26, when necessary, to the adding circuit 25 so that they are utilized for decoding a following P or B picture.

Data stored in one of the frame memories 27a to 27c is selected by a switch 27d, and the selected data are D/A converted by the D/A converter 28 and then supplied to the display 29, on which they are displayed subsequently.

Figure 5:
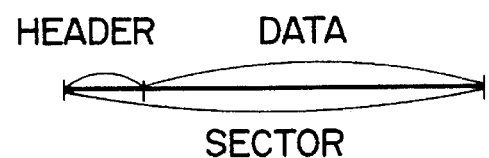
FIG. 5 is a diagram illustrating construction of a sector of an optical disk for use with the data reproducing apparatus shown in FIG. 3.
Figure 6:
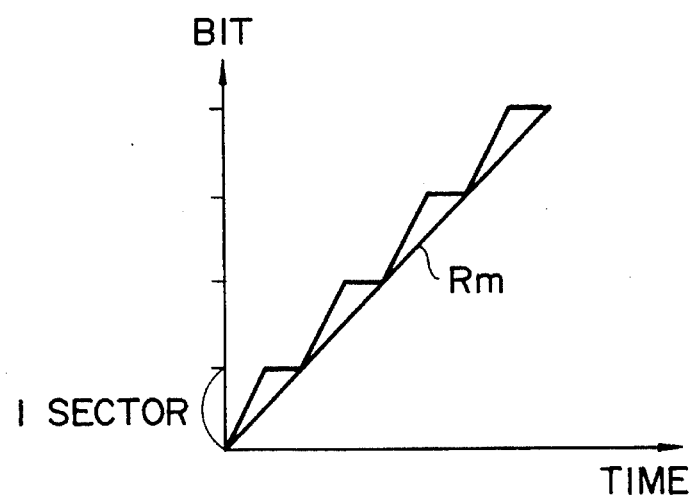
FIG. 6 is a diagram illustrating an amount of data to be written into a ring buffer memory of the data reproducing apparatus shown in FIG. 3.

The optical disk 16 which is rotated at a predetermined speed is sectioned into a plurality of sectors. Each sector is constituted, for example by a header portion and a data portion as shown in FIG. 5, and, for example, clock pits for producing clocks, wobbled pits for tracking and so forth are formed as pre-pits at the header portion. Meanwhile, video data and so forth are stored in the data portion. Accordingly, the data transfer rate to the ring buffer memory 45 periodically varies for each sector as shown in FIG. 6. In particular, at the header portion, transfer of data is not performed, and only data from the data portion are transferred to and stored in the ring buffer memory 45. An average transfer rate of data to the ring buffer memory 45 is indicated by Rm in FIG. 6.

Referring back to FIG. 3, the control circuit 46 reads out data stored in the ring buffer memory 45 and supplies them to the video code buffer 21 in response to a code request signal from the video code buffer 21. However, if processing of data of, for example, simple screens takes place successively so that the data transfer rate from the video code buffer 21 to the IVLC circuit 22 per unit time becomes low, the data transfer rate from the ring buffer memory 45 to the video code buffer 21 is also reduced. Consequently, there is the possibility that the amount of data stored in the ring buffer memory 45 may be increased until the ring buffer memory 45 overflows. To avoid this, the track jump judging circuit 47 calculates (detects) an amount of data currently stored in the ring buffer memory 45 from the writing point (WP) and the reproducing point (RP) and, when the amount of data exceeds a predetermined reference value set in advance, the track jump judging circuit 47 judges that there is the possibility that the ring buffer memory 45 may overflow and outputs a track jumping instruction to the tracking servo circuit 48.

Further, when the track jump judging circuit 47 detects a sector number abnormality signal from the sector detecting circuit 43, or an error occurrence signal from the ECC circuit 44, it calculates an amount of data remaining in the ring buffer memory 45 from the writing address (WP) and the reading address (RP) and further calculates an amount of data necessary to assure reading from the ring buffer memory 45 to the video code buffer 21 while the optical disk 16 makes one rotation from a track position at present (while waiting for one rotation of the optical disk 16). In case the remaining data amount of the ring buffer memory 45 is great, even if data are read out at a possible highest transfer rate from the ring buffer memory 45, and accordingly, the track jump judging circuit 47 judges that recovery of an error is possible by reproducing the optical disk 16 at the error occurring position again by the pickup 41 and outputs a track jumping instruction to the tracking servo circuit 48.

Figure 4:
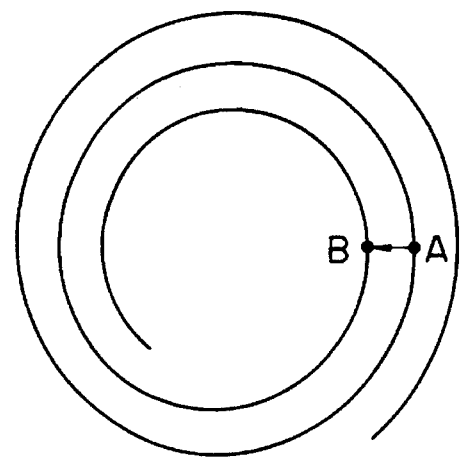
FIG. 4 is a diagram illustrating track jumping in the data reproducing apparatus shown in FIG. 3.

When the track jumping instruction output from the track jump judging circuit 47, the tracking servo circuit 48 jumps the reproducing position of the pickup 41, for example, from a position A to another position B on the inner side by one track distance as shown in FIG. 4. Then, for a period of time when the reproducing position advances from the position B to the position A again as a result of one rotation of the optical disk 16, that is, for a period of time until the sector number obtained from the sector detecting circuit 43 becomes equal to the original sector number from which track jumping was performed, the control circuit 46 inhibits writing of new data into the ring buffer memory 45, and when necessary, data already stored in the ring buffer memory 45 are transferred to the video code buffer 21.

Further, even if a sector number obtained from the sector detecting circuit 43 after track jumping coincides with the sector number obtained upon track jumping, in case the amount of data stored in the ring buffer memory 45 exceeds the predetermined reference value, that is, in case there is the possibility that the ring buffer memory 45 may overflow, writing of data into the ring buffer memory 45 is not resumed and track jumping is performed again. A method by which data are transferred to the ring buffer memory 45 when track jumping back by one track distance is performed is illustrated in FIG. 7.

Figure 7:
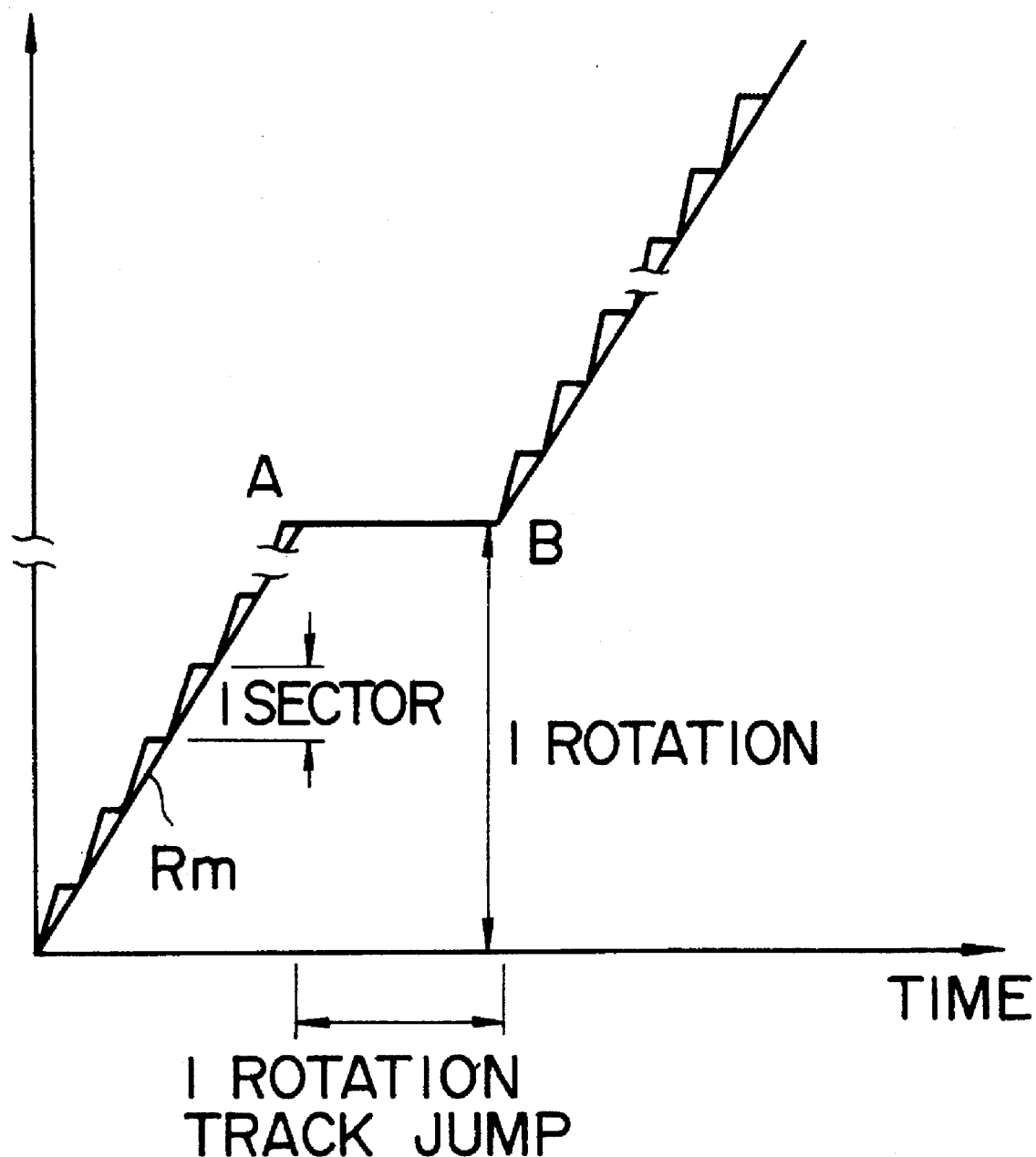
FIG. 7 is a diagram illustrating an amount of data to be written into the ring buffer memory of data reproducing apparatus shown in FIG. 3 upon track jumping.

As can be seen from FIG. 7, for a period of time until the optical disk 16 makes one full rotation after jumping back by one track until the reproducing position returns to the original reproducing position, writing of new data into the ring buffer memory 45 is not performed. Consequently, transfer of data to the ring buffer memory 45 is performed after an additional time equal to the period of time of such track jumping, and accordingly, the average transfer rate to the ring buffer memory 45 varies at values lower than Pan. In other words, Rm represents an allowable maximum average transfer rate.

Here, the ring buffer memory 45 has a capacity sufficient to store therein data for at least one track (one rotation) of the optical disk 16, that is, at least a storage capacity corresponding with a maximum period of rotation of the optical disk multiplied by Rm. Consequently, when the optical disk 16 is, for example, a CLV disk, the period of rotation is a maximum at an outermost circumference of the optical disk 16, and accordingly, the ring buffer memory 45 at least has a storage capacity for one track (one rotation) at the outermost circumference of the optical 16, in short, the storage capacity is at least equal to the period of rotation on the outermost circumference of the optical disk 16 multiplied by Rm.

Where the maximum transfer rate from the ring buffer memory 45 to the video code buffer 21 is represented by Rc, Rc is set to a value equal to or a little smaller than Rm (Rc≦Rm). When Rc is set to such value, a code request for transfer of data from the video code buffer 21 to the ring buffer memory 45 can be forwarded freely irrespective of the timing of a track jump.

By the way, when Rc is considerably smaller than Rm, for example, when Rc is equal to one half Rm or so, the amount of data written into the ring buffer memory 45 is greater than the amount of data read out from the ring buffer memory 45, and consequently, the condition wherein the ring buffer memory 45 is almost full of data will continue. On the other hand, in case the optical disk 16 is CLV disk, the amount of data reproduced while the optical disk 16 makes one full rotation is considerably different depending on whether data are reproduced from an inner circumference or an outer circumference of the optical disk 16. If the storage capacity of the ring buffer memory 45 is adjusted for an outermost circumference of the optical disk 16 at which the amount of data at a maximum in the optical disk 16, then considerable room is present in the storage capacity of the ring buffer memory 45 at an inner circumference of the optical disk 16. Consequently, the probability that error recovery by jumping back as described above may take place is high. If the storage capacity of the ring buffer memory 45 is further increased, then the probability that error recovery can be performed is increased as much, and if the storage capacity is higher than twice that at an outermost circumference track of the optical disk 16, then error recovery can always be performed independently of a remaining amount of data in the ring buffer memory 45.

Figure 8A:
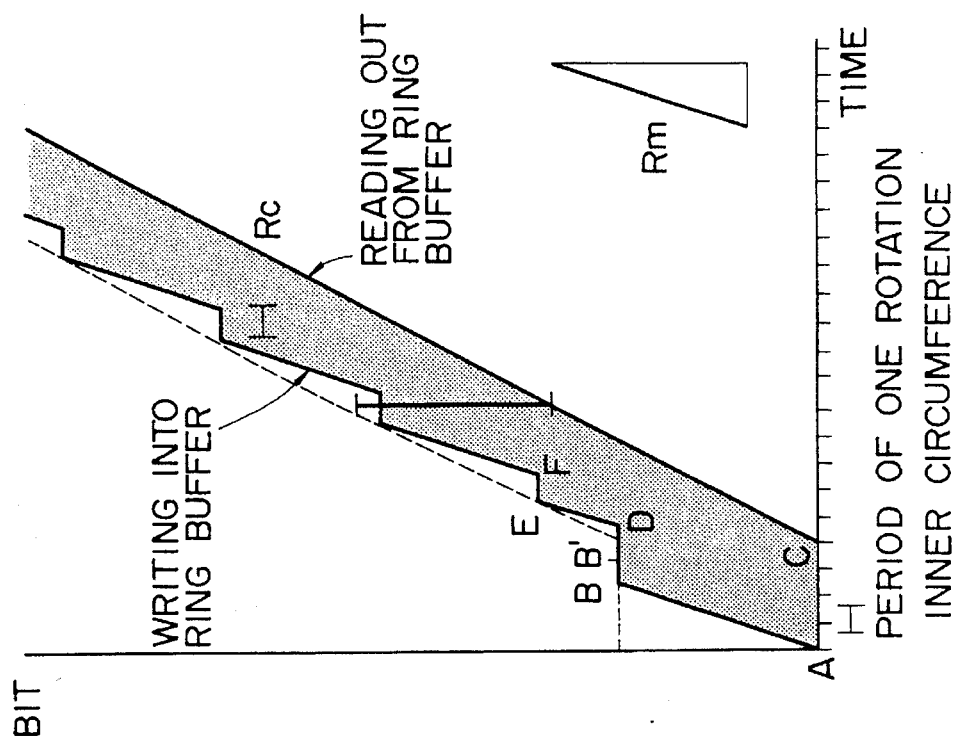
FIGS. 8(a) and 8(b) are diagrams illustrating modes of writing and reading of data into and from the ring buffer memory, respectively, of the data reproducing apparatus shown in FIG. 3.
Figure 8B:
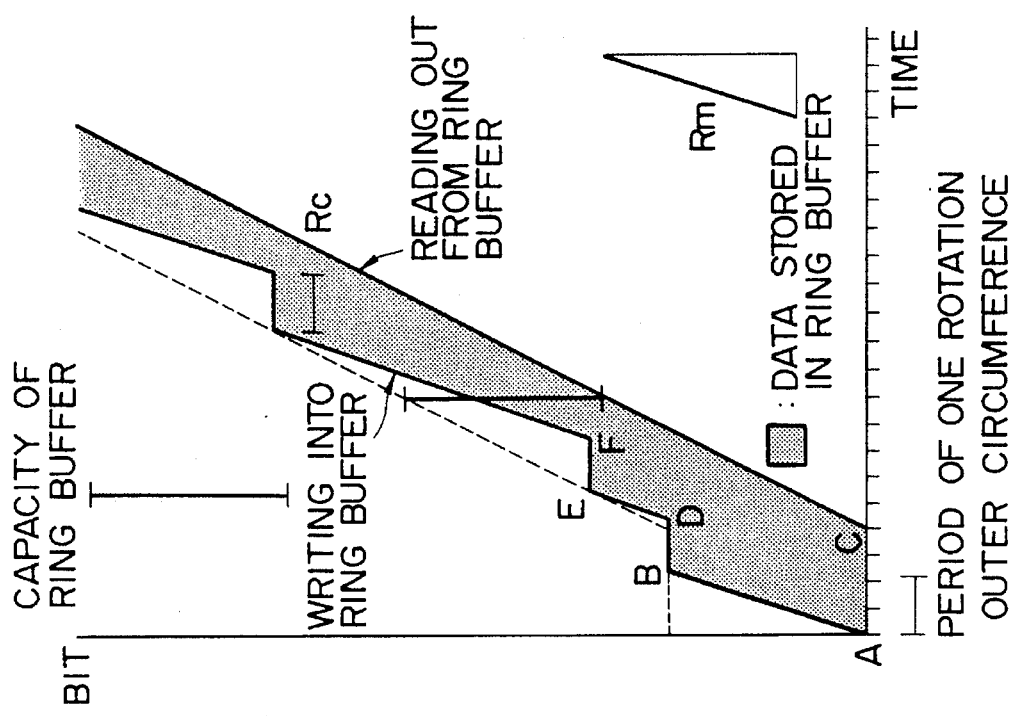

Subsequently, a relationship between the capacity of the ring buffer memory 45 and the transfer rate will be described. FIGS. 8(*a*) and 8(*b*) illustrate modes of writing and reading data into and from the ring buffer memory 45 when data are being read out at a fixed high bit rate from the ring buffer memory 45. FIG. 8(*a*) illustrates a mode in which the pickup 41 is reading from an outer circumference of the optical disk 16 when FIG. 8(*b*) illustrates a mode in which the pickup 41 is reading from an inner circumference of the optical disk 16.

In the case of FIG. 8(*a*), writing of data into the ring buffer memory 45 is started at an average transfer rate Rm (point A), and the ring buffer memory 45 is filled with data soon, whereupon writing is stopped (point B). Then, the pickup 41 track jumps so as to return to another track by one track distance. Meanwhile, reading out of data from the ring buffer memory 45 is started (point C), and after a time passes in which the optical disk 16 makes one full rotation, if there is a free area in the ring buffer memory 45, then writing of data is started again (point D). Such writing is stopped again (point E) when the ring buffer memory 45 becomes full, and then after a time passes in which the optical disk 16 makes one full rotation, writing of data is resumed (Point F). In this instance, as the rate of reading out of data from the ring buffer memory 45 increases (as the transfer rate Rc increases), the amount of data (the shadowed areas in FIG. 8(*a*)) remaining in the ring buffer memory 45 decreases. It is to be noted that a broken line in FIG. 8(*a*) indicates a position at which the ring buffer memory 45 becomes full.

In the case of FIG. 8(*b*) illustrating a mode of reading from an inner circumference of the optical disk 16, since the time in which the optical 16 makes one full rotation is shorter than that when the pickup 41 reads from an outer circumference of the optical disk 16, even after track jumping is performed (point B'), there is not free area in the ring buffer memory 45 as yet. Consequently, the pickup 41 performs track jumping again (between the points B' and D). As a result, the amount of data remaining in the ring buffer memory 45 at the point F is greater than that shown in FIG. 8(*a*) which illustrates a mode of reading from an outer circumference of the optical disk 16).

Figure 9A:
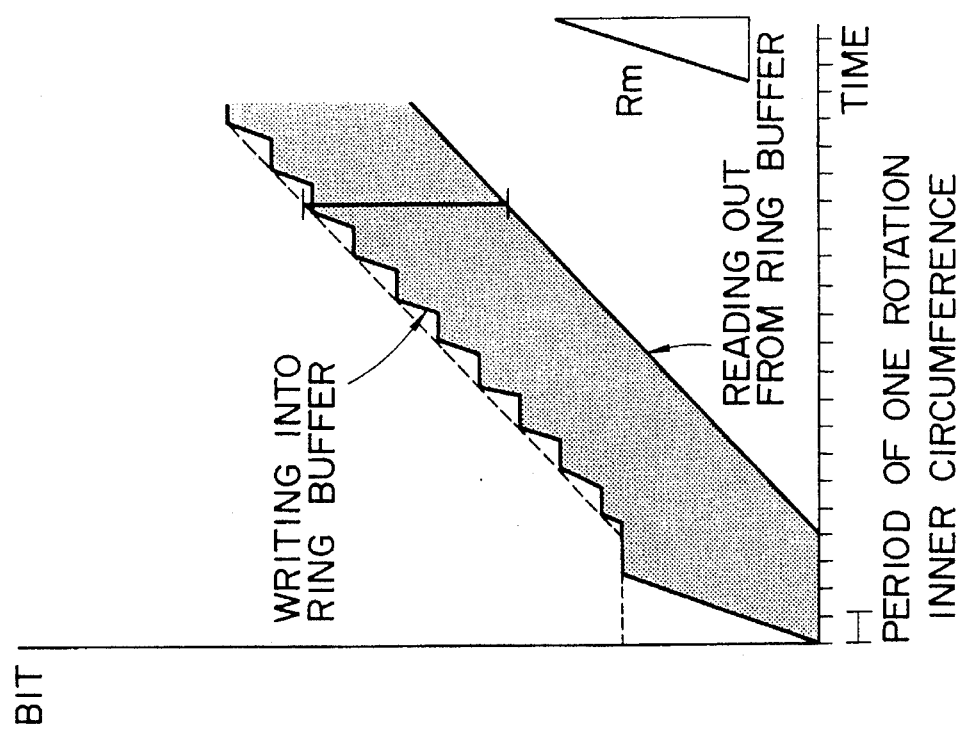
FIGS. 9(a) and 9(b) are views similar to those of FIGS. 8(a) and 8(b) but illustrating different modes of writing and reading of data into and from the ring buffer memory, respectively, of the data reproducing apparatus shown in FIG. 3.
Figure 9B:
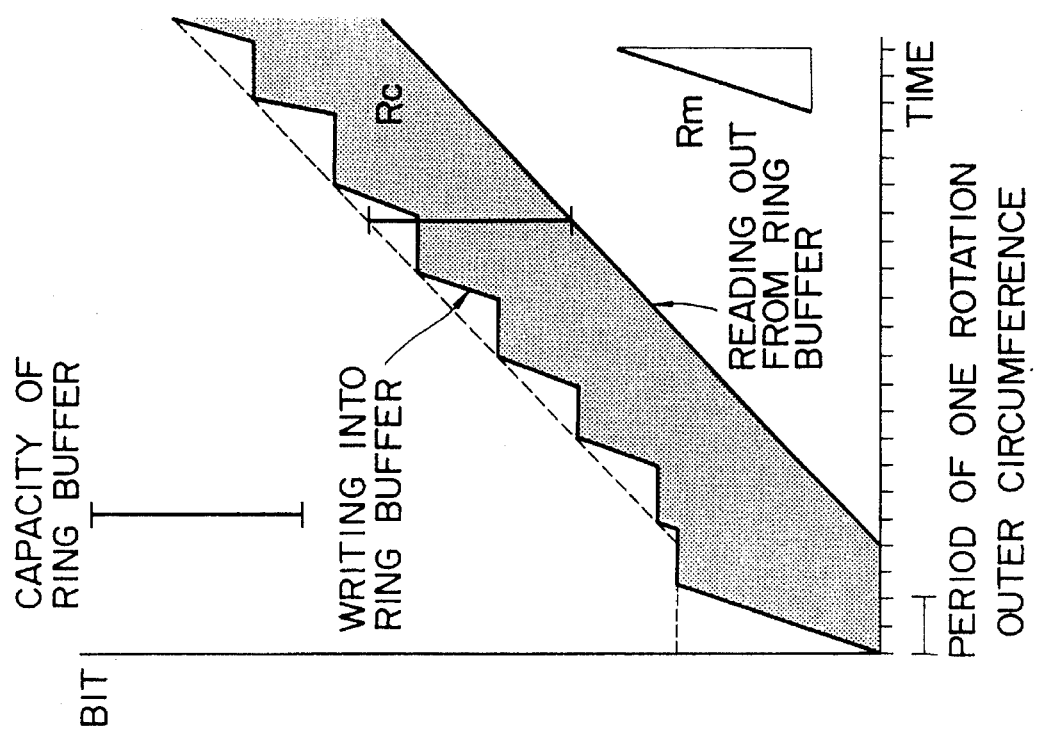

FIGS. 9(*a*) and 9(*b*) illustrate modes of writing and reading data into and from the ring buffer memory 45 when data are readout at a fixed low bit rate from the ring buffer memory 45. In particular, FIG. 9(*a*) illustrates a mode in which the pickup 41 is on an outer circumference of the optical disk 16 on which data are recorded at a fixed linear velocity while FIG. 9(*b*) illustrates a mode in which the pickup 41 is on an inner circumference of the optical disk 16. The amount of data remaining in the ring buffer memory 45 after track jumping is greater than that of the case wherein reading out of data is performed at high rate (FIGS. 8(*a*) and 8(*b*)).

Figure 10A:
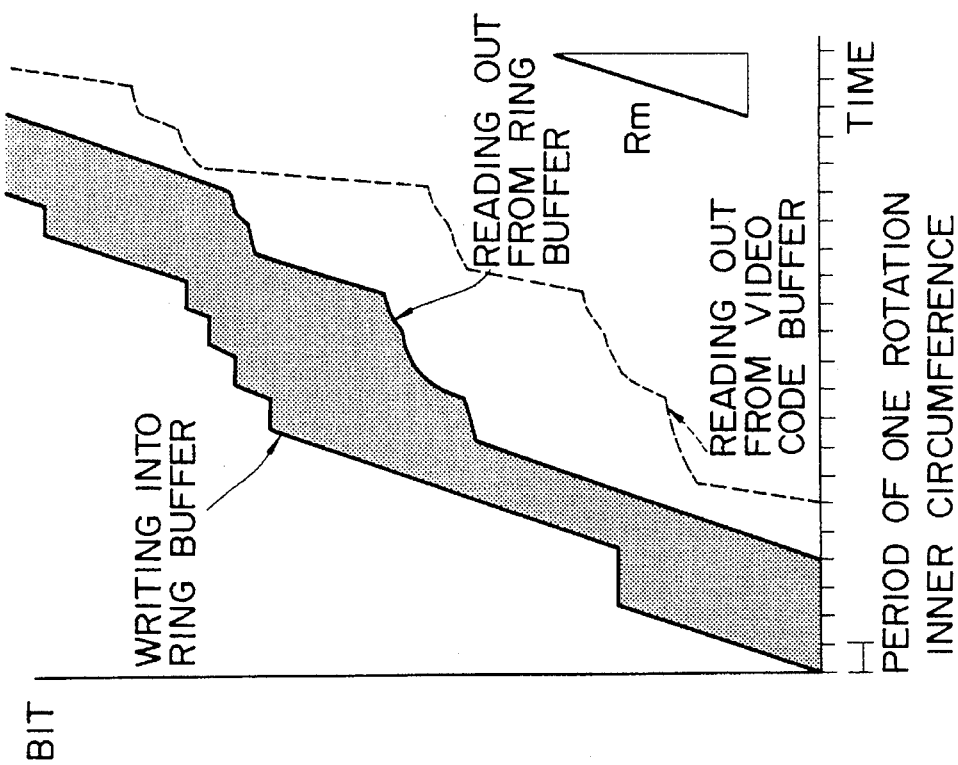
FIGS. 10(a) and 10(b) are similar views but illustrating further different modes of writing and reading of data into and from the ring buffer memory, respectively, of the data reproducing apparatus shown in FIG. 3.
Figure 10B:
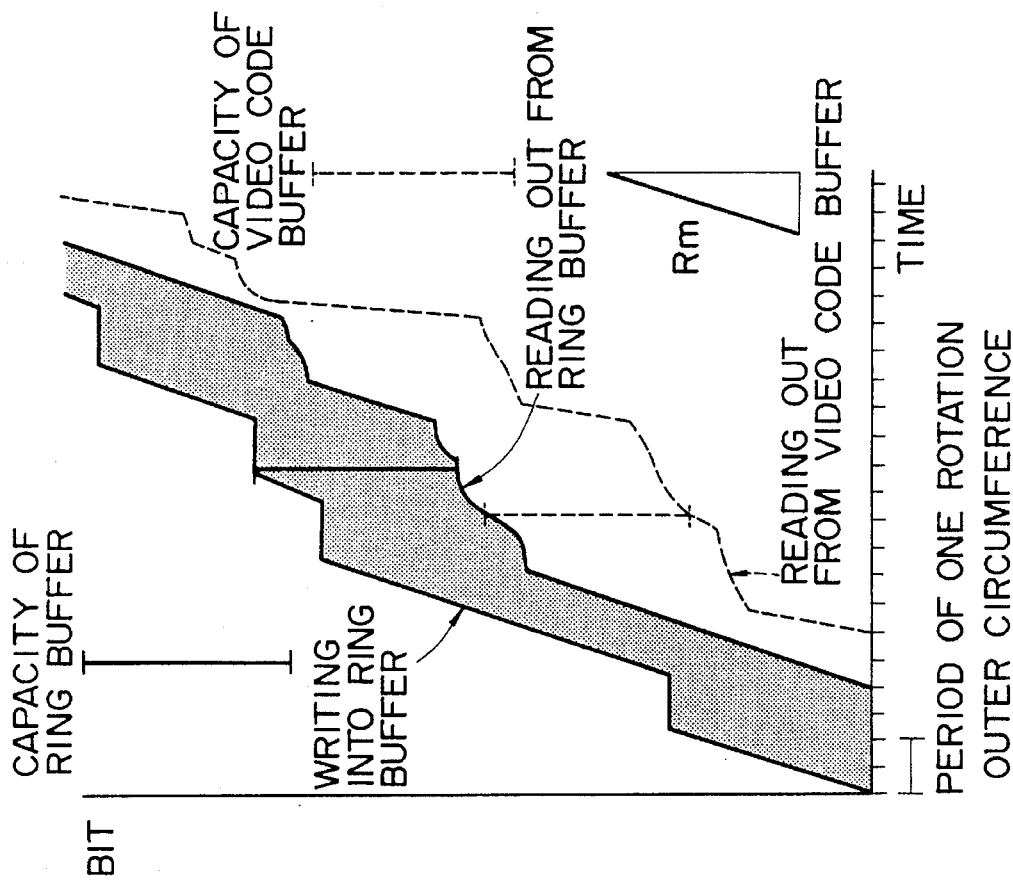

FIGS. 10(*a*) and 10(*b*) illustrates modes of writing and reading data into and from the ring buffer memory 45 when data are being read out from the ring buffer memory 45 at a variable rate which does not exceed Rc. In particular, FIG. 10(*a*) illustrates a mode in which the pickup 41 is on an outer circumference of the optical disk 16 on which data are recorded at a fixed linear velocity while FIG. 10(*b*) illustrates a mode in which the pickup 41 is on an inner circumference of the optical disk 16. In FIGS. 10(*a*) and 10(*b*), a broken line indicates reading out of data from the video code buffer 21. Meanwhile, a line representing the reading of data from the ring buffer memory 45 likewise represents writing of data into the video code buffer 21.

Since reading of data from the ring buffer memory 45 is performed normally at a variable rate, a line indicative of such reading is not a straight line as shown in FIGS. 8(*a*) to 9(*b*) but is a polygonal line as shown in FIG. 10(*a*) or 10(*b*). In FIGS. 10(*a*) and 10(*b*), the lines indicative of reading data from the ring buffer memory 45 are the same as each other. This is because the ring buffer memory 45 absorbs a difference between times in which the optical disk 16 makes one full rotation when reading is performed at an inner circumference and an outer circumference of the optical disk 16. On the other hand, while the gradient of the reading line for data from the ring buffer memory 45 cannot exceed the maximum average transfer rate Rm, the transfer rate Rv to the IVLC circuit 22 (gradient of the reading line (indicated by broken lines in FIGS. 10(*a*) and 10(*b*) of data from the video code buffer 21) can be set to a transfer rate higher than the maximum average transfer rate Rm due to the presence of the video code buffer 21 interposed between the ring buffer memory 45 and the IVLC circuit 22.

Further, FIG. 11 shows an exemplary manner in which the amount of reproduced data can vary when the optical disk 16 is reproduced from the beginning to the end. It can be seen from FIG. 11 that the amount of data reproduced per unit time is relatively large in a section of complicated images, but the amount of reproduced data is small in another section of simple images.

In this manner, when data are being reproduced from the optical image 16, the transfer rate of data to the ring buffer memory 45 is fixed, but since track jumping takes place when necessary, when the entire period from the starting point to the ending point is considered, the average transfer rate is variable.

Figure 12:
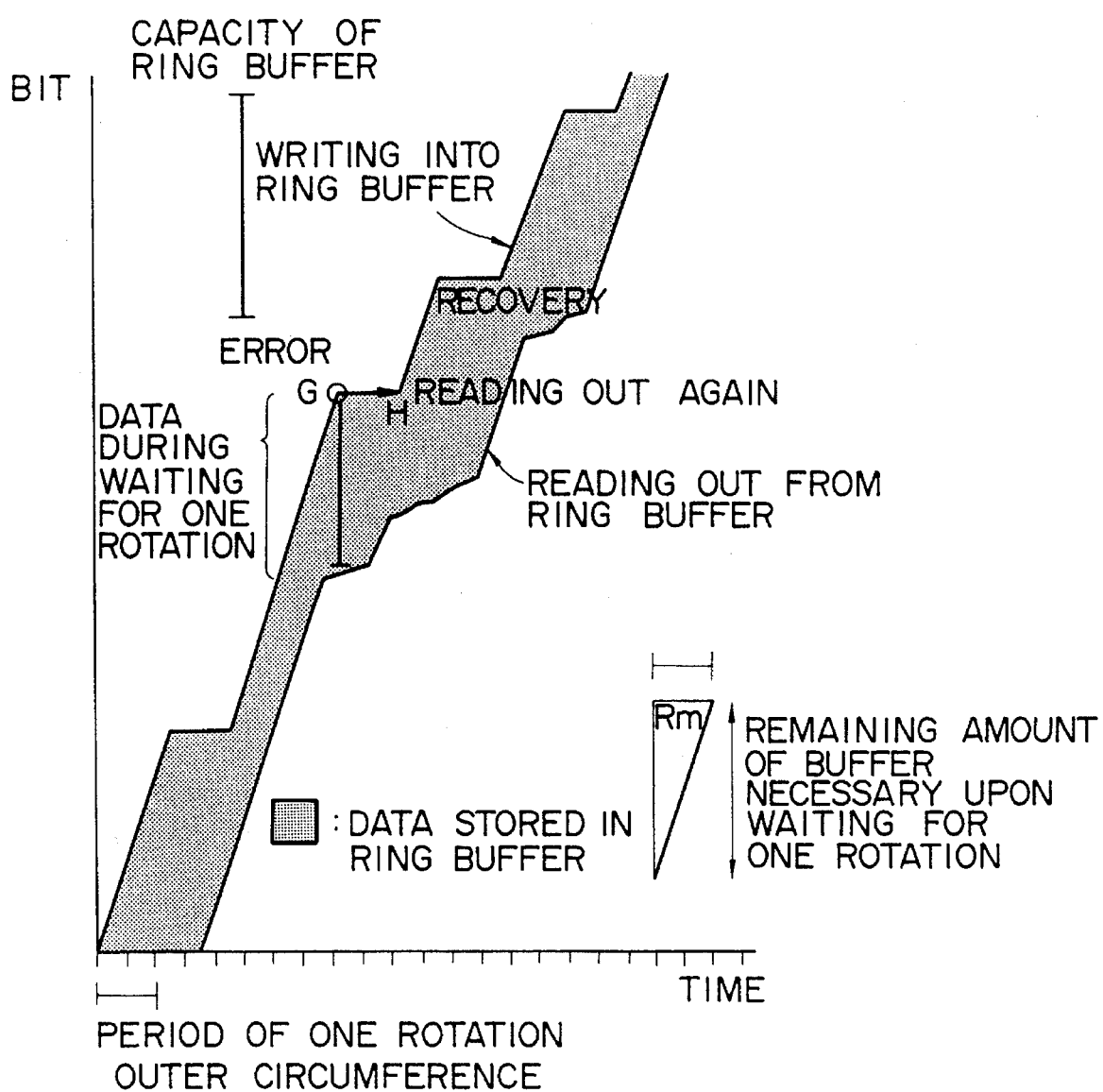
FIG. 12 is a diagram illustrating writing and reading of data into and from the ring buffer memory of the data reproducing apparatus shown in FIG. 3 upon recovery from an error.
Figure 13:
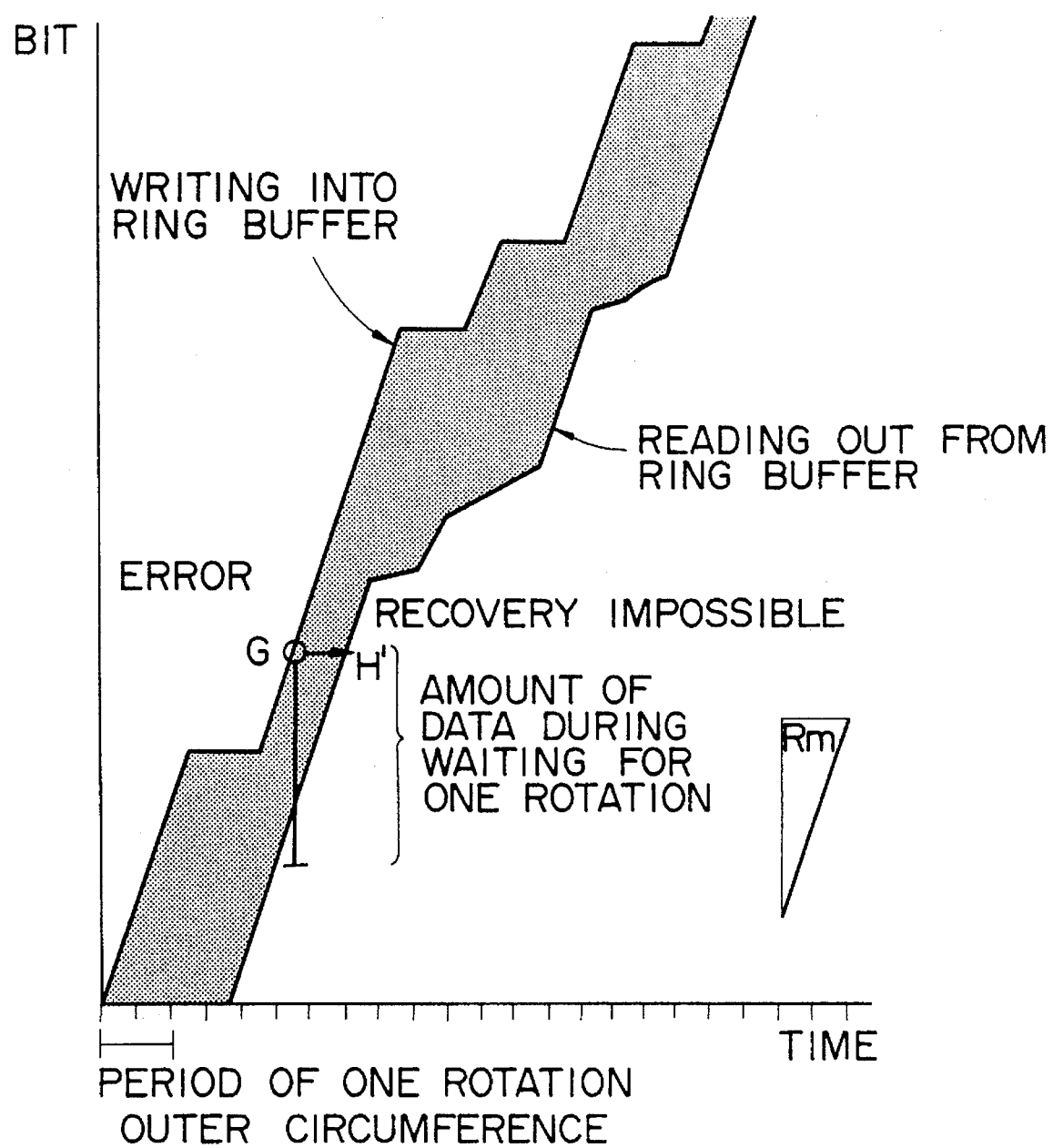
FIG. 13 is a view similar to that of FIG. 12 but illustrating conditions restricting recovery from an error in the data reproducing apparatus shown in FIG. 3.

Subsequently, FIGS. 12 and 13 illustrate recovering operations by the ring buffer memory 45 when an error appears in reading data from the optical disk 16. FIG. 12 illustrates the recovering operation when reading data from the ring buffer memory 45 at a variable rate. For example, when an error is caused in reading data from the optical disk 16, for example, by mechanical vibrations to disable writing of data into the ring buffer memory 45 (point G), if the amount of data stored in the ring buffer memory 45 (shadowed area in FIG. 12) is greater than an amount of data corresponding to one rotation of the optical disk 16, then the pickup 41 performs track jumping to perform a reading of the data again (point H). Consequently, recovery is achieved without affecting reading from the ring buffer memory 45 at all.

On the other hand, in the case of FIG. 13, when an error is caused in reading data from the optical disk 16, for example, by mechanical vibrations to disable writing of data into the ring buffer memory 45 (point G), since the amount of data stored in the ring buffer memory 45 (shadowed area in FIG. 13) is smaller than an amount of data corresponding to one rotation of the optical disk 16, the ring buffer memory 45 becomes empty (point H') before reading out is performed again, and accordingly, recovery cannot be performed without affecting the reading of data from the ring buffer memory 45.

Figure 14B:
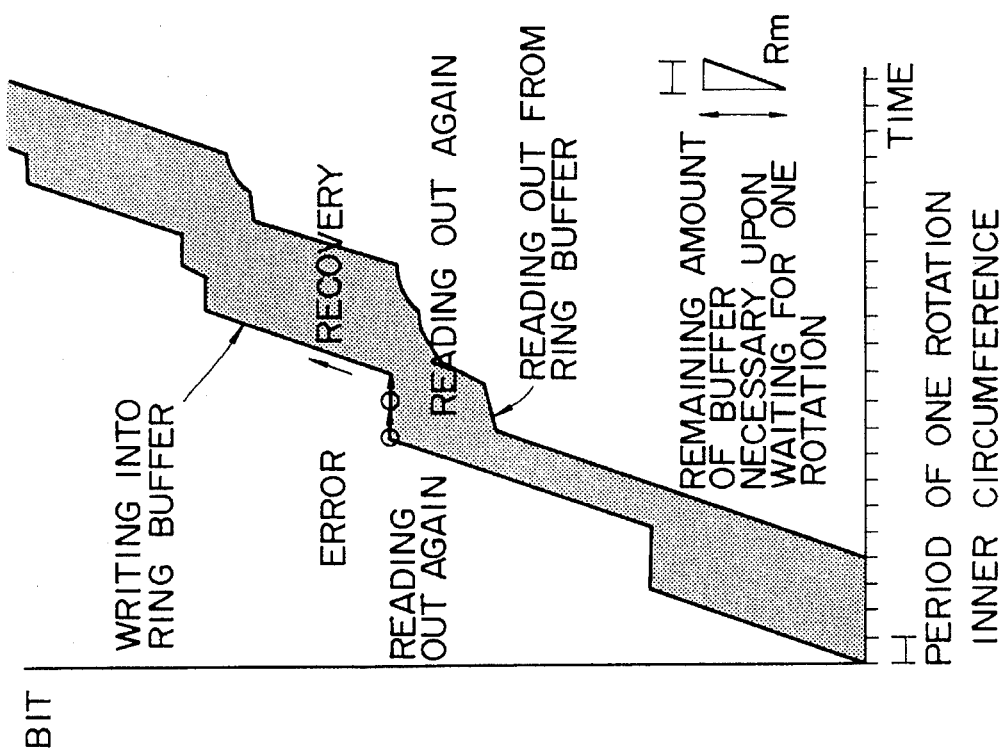
FIGS. 14(a) and 14(b) are diagrams illustrating different modes of writing and reading data into and from the ring buffer memory, respectively, of the data reproducing apparatus shown in FIG. 3 upon recovery from an error.
Figure 14A:
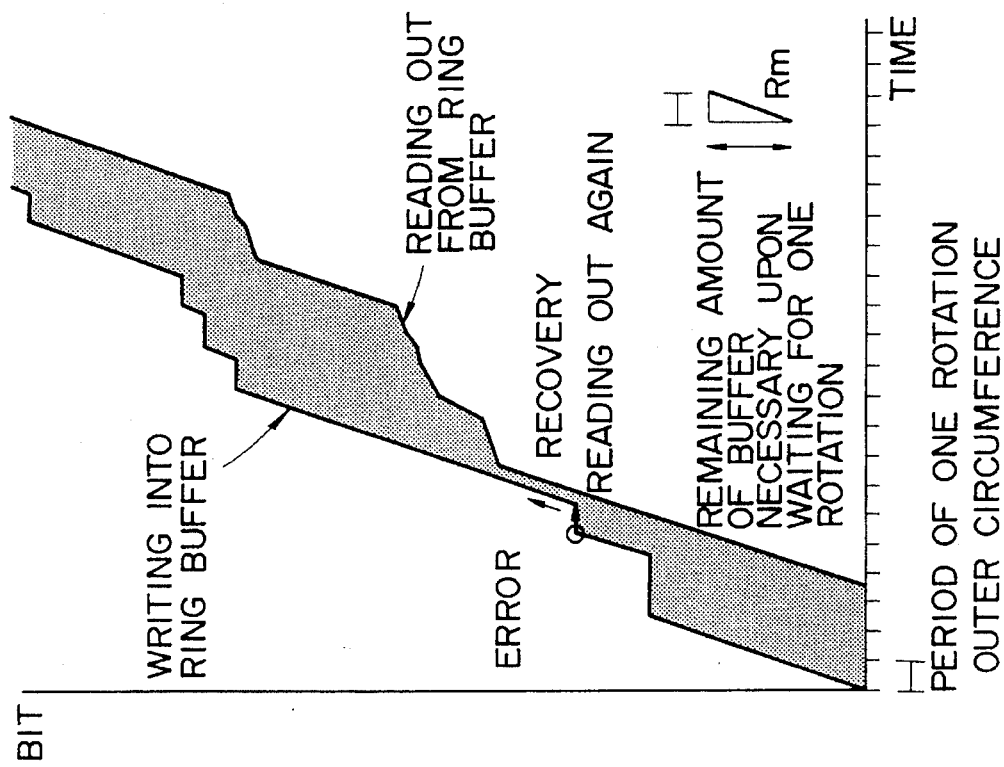

Subsequently, when, for example, the position at which data recorded on the optical disk 16 are being reproduced is an inner circumferential track and accordingly the waiting time for one complete rotation of the optical disk 16 is comparatively short so that there is sufficient room in the remaining storage capacity of the ring buffer memory 45, or when the storage capacity of the ring buffer memory 45 is set to a sufficiently large value in advance, the ability of the ring buffer memory 45 to recover when an error takes place in reading data from the optical disk 16 is high. In particular, when data are being read from an inner circumference of the optical disk 16, since the time required for one full rotation is short, even if the amount of data stored in the ring buffer memory 45 is small, error recovery can be performed (FIG. 14(a)). Further, in case an error takes place even upon re-reading, re-reading is performed repetitively so far as the remaining amount of data of the ring buffer memory 45 allows this (FIG. 14(b)). Similarly, if the capacity of the ring buffer memory 45 is set to a sufficiently high value in advance since surplus data can be stored in the ring buffer memory 45, the error recovering faculty is high.

It is be noted that the optical disk 16 may be replaced by some other disk such as, for example an opto-magnetic disk or a magnetic disk.

While a specific embodiment of the invention has been shown and disclosed, it is to be understood that numerous changes and modifications may be made by those skilled in the art without departing from the scope and intent of the invention.

What is claimed is:

1. A digital data reproducing apparatus for reproducing digital data in variable length encoded form from a disk, comprising:

pickup means for picking up the digital data from the disk;

first storage means for storing the digital data and for reading the stored digital data therefrom at a first variable rate;

second storage means for storing the digital data read from the first storage means, the second storage means being operative to store the digital data at said first variable rate and to read the digital data stored therein at a second variable rate varying within a predetermined range inching at least one value higher than a maximum value of said first variable rate;

inverse variable length code means for inverse variable length code processing the data read from said second storage means to produce inverse variable length code processed data, the inverse variable length code means being operative to receive the data at said second variable rate; and jump controlling means for causing said pickup means to track jump in accordance with an amount of data stored in said first storage means.

2. A digital data reproducing apparatus according to claim 1, wherein the pickup means is operative to pick up digital data including video data.

3. A digital data reproducing apparatus according to claim 1, wherein said pickup means is operative to pick up said digital data from an optical disk with the use of a laser beam.

4. A digital data reproducing apparatus according to claim 1, further comprising sector detecting means for detecting a sector number from the digital data picked up by said pickup means, and means for producing a write address for the digital data in said first storage means in accordance with the detected sector number.

5. A digital data reproducing apparatus according to claim 1, wherein said jump controlling means is operative to cause said pickup means to track jump from a current reading position toward an inner circumference of said disk by one track, and said first storage means has a storage capacity at least sufficient to store a predetermined portion of the digital data corresponding with one rotation of the disk proximal to an outermost circumference thereof.

6. A digital data reproducing apparatus according to claim 1, wherein said first storage means comprises a ring buffer memory.

7. A digital data reproducing apparatus according to claim 1, further comprising an inverse quantizing circuit for inversely quantizing a predetermined portion of the inverse variable length code processed data.

8. A digital data reproducing apparatus according to claim 1, further comprising inverse discrete cosine transform means for inverse discrete cosine transform processing the inverse variable length code processed data.

9. A digital data reproducing apparatus according to claim 1, further comprising movement compensating means for performing movement compensation of said inverse variable length code processed data in accordance with movement vector information included in a predetermined portion of the digital data.

10. A digital data reproducing apparatus according to claim 1, wherein said first storage means is operative to receive said digital data for storage therein with a maximum average transfer rate higher than a maximum transfer rate from said first storage means to said second storage means.

11. A digital data reproducing apparatus for reproducing digital data in coded form from a disk, comprising:

pickup means for picking up the digital data from the disk;

sector detecting means for detecting a sector number from the digital data picked up by the pickup means and producing an error occurrence signal in response to a failure to regularly detect the sector number;

first storage means for storing the digital data and for reading the stored digital data therefrom at a variable rate;

second storage means for storing the digital data read from the first storage means, the second storage means being operative to store the digital data at said variable rate and to read the digital data stored therein;

decoding means for decoding the digital data read by said second storage means; and jump controlling means for causing said pickup means to track jump in accordance with the error occurrence signal and an amount of data stored in said first storage means.

12. A digital data reproducing apparatus according to claim 11, further comprising means for detecting and correcting an error in the digital data picked up by said pickup means, determining the presence of an uncorrectable error in the digital data, and providing the error occurrence signal to said jump controlling means in response to the determination of an uncorrectable error.

13. A digital data reproducing apparatus according to claim 11, wherein the pickup means is operative to pick up digital data including video data.

14. A digital data reproducing apparatus according to claim 11, wherein said pickup means is operative to pick up said digital data from an optical disk with the use of a laser beam.

15. A digital data reproducing apparatus according to claim 11, wherein said jump controlling means is operative to cause said pickup means to track jump from a current reading position toward an inner circumference of said disk by one track, and said first storage means has a storage capacity at least sufficient to store a predetermined portion of the digital data corresponding with one rotation of the disk at an outermost circumference thereof.

16. A digital data reproducing apparatus according to claim 11, wherein said first storage means comprises a ring buffer memory.

17. A digital data reproducing apparatus according to claim 11, wherein said decoding means includes inverse variable length code means for inverse variable length code processing a predetermined portion of the digital data.

18. A digital data reproducing apparatus according to claim 11, wherein said decoding means includes an inverse quantizing circuit for inversely quantizing a predetermined portion of the digital data.

19. A digital data reproducing apparatus according to claim 11, wherein said decoding means includes inverse discrete cosine transform means for inverse discrete cosine transform processing a predetermined portion of the digital data.

20. A digital data reproducing apparatus according to claim 11, wherein said decoding means includes movement compensating means for performing movement compensation of said digital data in accordance with movement vector information included in a predetermined portion of the digital data.

21. A digital data reproducing apparatus according to claim 11, wherein the first storage means is operative to store the digital data at a write address determined in accordance with a corresponding detected sector number.

22. A digital data reproducing apparatus according to claim 11, wherein said first storage means is operative to receive said digital data for storage therein with a maximum average transfer rate higher than a maximum transfer rate from said first storage means to said second storage means.

23. A digital data reproducing apparatus for reproducing digital data in coded form from a disk, comprising:

pickup means for picking up the digital data from the disk;

error detecting means for detecting an error in the digital data picked up by said pickup means and producing an error occurrence signal;

first storage means for storing the digital data therein and for reading the stored digital data therefrom at a variable rate, said first storage means having a storage capacity greater than twice an amount of data in a track proximal to an outermost circumference of the disk;

second storage means for storing the digital data read from the first storage means, the second storage means being operative to store said digital data at said variable rate and to read the stored digital data therefrom;

decoding means for decoding digital data read from said second storage means; and jump controlling means for causing said pickup means to track jump in accordance with the error occurrence signal.

24. A digital data reproducing method for reproducing digital data recorded on a disk, comprising the steps of:

picking up the digital data from the disk;

writing the digital data in a first memory at a first transfer rate within a first predetermined range;

reading the digital data stored in said first memory at a second transfer rate which is below the first predetermined range and which is variable;

storing the digital data read from said first memory in a second memory at said second transfer rate; and reading the digital data stored in said second memory at a variable rate within a second predetermined range including at least one value higher than a maximum value of the first predetermined range.

25. A digital data reproducing method according to claim 24, further comprising the step of suspending writing of the digital data in said first memory temporarily based on a storage capacity of said first memory.

26. A digital data reproducing method according to claim 24, further comprising the steps of:

detecting an error in the digital data picked up from the disk;

producing an error occurrence signal in accordance with the detection of such error; and suspending writing of the digital data in said first memory temporarily in accordance with the error occurrence signal.

27. A digital data reproducing method according to claim 24, further comprising the step of inverse variable length code processing the digital data read from said second memory.

28. A digital data reproducing method according to claim 24, further comprising the step of inversely quantizing the digital data read from said second memory.

29. A digital data reproducing method according to claim 24, further comprising the step of inverse discrete cosine transform processing the digital data read from said second memory.

30. A digital data reproducing method according to claim 24, further comprising the step of performing movement compensation of the digital data read from said second memory.

31. A digital data reproducing method according to claim 25 or 26, wherein the step of picking up the digital data from said disk is carried out with the use of a pickup, and the step of suspending writing of the digital data includes the step of causing the pickup to track jump.

32. A digital data reproducing method according to claim 26, wherein the step of detecting an error includes the step of detecting a sector number from the digital data.

33. A digital data reproducing method according to claim 26, wherein the step of detecting an error includes the steps of detecting an error in the digital data and correcting the detected error.

* * * * *